US012680565B2

(12) United States Patent
Miura

(10) Patent No.: US 12,680,565 B2
(45) Date of Patent: Jul. 14, 2026

(54) CLIP AND CLIP ATTACHMENT STRUCTURE

(71) Applicant: NIFCO INC., Yokosuka (JP)

(72) Inventor: Souhei Miura, Yokosuka (JP)

(73) Assignee: NIFCO INC., Yokosuka (JP)

( * ) Notice: Subject to any disclaimer, the term of this patent is extended or adjusted under 35 U.S.C. 154(b) by 168 days.

(21) Appl. No.: 18/288,277

(22) PCT Filed: Jun. 6, 2022

(86) PCT No.: PCT/JP2022/022840
§ 371 (c)(1),
(2) Date: Oct. 25, 2023

(87) PCT Pub. No.: WO2022/270292
PCT Pub. Date: Dec. 29, 2022

(65) Prior Publication Data
US 2024/0209886 A1 Jun. 27, 2024

(30) Foreign Application Priority Data

Jun. 22, 2021 (JP) ................................. 2021-103554

(51) Int. Cl.
B60R 19/24 (2006.01)
F16B 21/07 (2006.01)
*F16B 21/06* (2006.01)
(52) U.S. Cl.
CPC ............ F16B 21/075 (2013.01); *B60R 19/24* (2013.01); *F16B 21/06* (2013.01); *Y10T 24/309* (2015.01)
(58) Field of Classification Search
CPC ........ F16B 21/02; F16B 21/04; F16B 21/075; F16B 7/20; F16B 21/065; F16B 2005/067;

(Continued)

(56) References Cited

U.S. PATENT DOCUMENTS 3,248,129 A * 4/1966 Brown .................... E21B 17/06
175/320
3,776,649 A * 12/1973 Kemezys .............. F16C 11/069
403/90

(Continued)

FOREIGN PATENT DOCUMENTS

CN 102395802 A 3/2012
JP 2012-240521 A 12/2012

(Continued)

OTHER PUBLICATIONS

PCT/ISA/210, "International Search Report for PCT International Application No. PCT/JP2022/022840," Aug. 9, 2022.

(Continued)

*Primary Examiner* — Jason W San
*Assistant Examiner* — Michael S Lee
(74) *Attorney, Agent, or Firm* — HAUPTMAN HAM, LLP

(57) ABSTRACT

The present invention provides a clip including: a first member including a base, a pin portion projecting from the base, and an insertion receiving part that is a recess or a through-hole provided in the base; and a second member including a tube which is inserted into and mounted to a mounting hole formed in a mounting member, internally receives the insertion of the pin portion, and is rotatably mounted to the pin portion, and an inserted portion to be inserted into the insertion receiving part when the pin portion is inserted into the tube, wherein a guide is provided in a peripheral part of the insertion receiving part in the base, the guide contacting the inserted part and guiding the inserted part to the insertion receiving part when the pin portion is inserted into the tube.

7 Claims, 20 Drawing Sheets

(58) Field of Classification Search
CPC .. F16B 5/0657; Y10T 403/7007; Y10T 24/42;
Y10T 24/45105; Y10T 24/30; Y10T
24/309; Y10T 24/45094; Y10T 24/45089;
Y10T 24/45; Y10T 24/4522; B60R 19/24;
B60R 2011/004; B60R 13/0206; B60R
2019/1886; Y10S 24/54
See application file for complete search history.

(56)                    References Cited

U.S. PATENT DOCUMENTS

| 5,722,574 | A | * | 3/1998 | Pratt | ........................ | A45F 5/00 |
| | | | | | | 224/660 |
| 2012/0292932 | A1 | | 11/2012 | Sano | | |
| 2020/0156522 | A1 | * | 5/2020 | Booth | .................... | B60N 2/894 |

FOREIGN PATENT DOCUMENTS

| JP | 2013-096546 A | 5/2013 |
| JP | 2016-109192 A | 6/2016 |

OTHER PUBLICATIONS

China Patent Office, First Office Action for Chinese Patent Application No. 202280042264.6 dated Mar. 3, 2026; 12 pp.

* cited by examiner

CLIP AND CLIP ATTACHMENT STRUCTURE

FIELD OF THE INVENTION

The present disclosure relates to a clip and a clip attachment structure.

BACKGROUND OF THE TECHNOLOGY

Japanese Patent Publication No. 2012-240521 discloses a retainer for attaching a bumper to a vehicle body. The retainer includes a pin insertion hole, wherein a pin portion of a pin member is inserted into the pin insertion hole, and then, by rotating an operation lever of the pin member for 90 degrees, the pin member is locked to the retainer.

SUMMARY OF THE INVENTION

Problems to be Solved by the Invention

By the way, in Japanese Patent Publication No. 2012-240521, when the pin portion of the pin member is inserted into the pin insertion hole of the retainer, it is necessary to attach the pin member to the retainer while adjusting a direction of the operation lever to a correct direction (in other words, a rotational position of the operation lever is a correct rotational position). For this reason, the technology disclosed in Japanese Patent Publication No. 2012-240521 has a room to improve a positing of the pin member relative to the retainer.

The above fact is considered in the present disclosure, and in a structure having a first member and a second member, when the first member is attached to the second member, the present invention provides a clip and a clip attachment structure wherein the positioning of the second member to the first member can be easily made.

Means for Solving the Problems

A clip of one embodiment of the disclosure comprises: a first member including a base member, a pin portion projecting from the base member, and an inserted portion which is a dent or a through hole provided in the base member, and a second member including a tube portion configured to be inserted into an attachment hole formed in an attachment member and attached thereto, to which the pin portion is inserted inside and rotationally attached, and an insertion portion inserted into the inserted portion when the pin portion is inserted into the tube portion, wherein a guide portion which contacts the insertion portion when the pin portion is inserted into the tube portion and guides the insertion portion to the inserted portion is provided around the inserted portion of the base member.

A clip of another embodiment of the disclosure comprises: a first member including a base member, a pin portion projecting from the base member, and an insertion portion provided on the base member and projecting in a same direction as the base member; and a second member including a tube portion configured to be inserted into an attachment hole formed in an attachment member and attached thereto, to which the pin portion is inserted inside and rotationally attached, and an inserted portion to which the insertion portion is inserted when the pin portion is inserted into the tube portion, wherein a guide portion which contacts the insertion portion when the pin portion is inserted into the tube portion, and guides the insertion portion to the inserted portion is provided around the inserted portion in the second member.

Advantages of the Invention

According to the disclosure, the clip with a structure equipped with the first member and the second member, wherein when the second member is attached to the first member, positioning of the second member relative to the first member can be made easily, and the clip attachment structure, are provided.

EMBODIMENTS TO CARRY-OUT THE INVENTION

Next, a clip and a clip attachment structure of an embodiment of the invention are explained with reference to FIG. 1 to FIG. 21.

Figure 2:
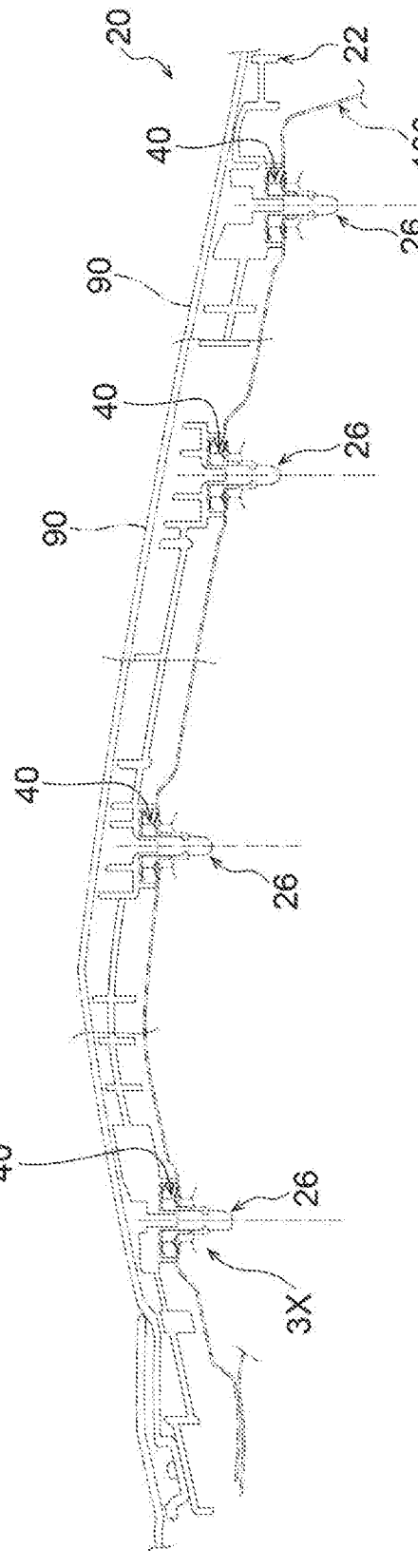
FIG. 2 is a sectional view showing a section cutting the retainer in a longitudinal direction at a position of a pin member.
Figure 3:
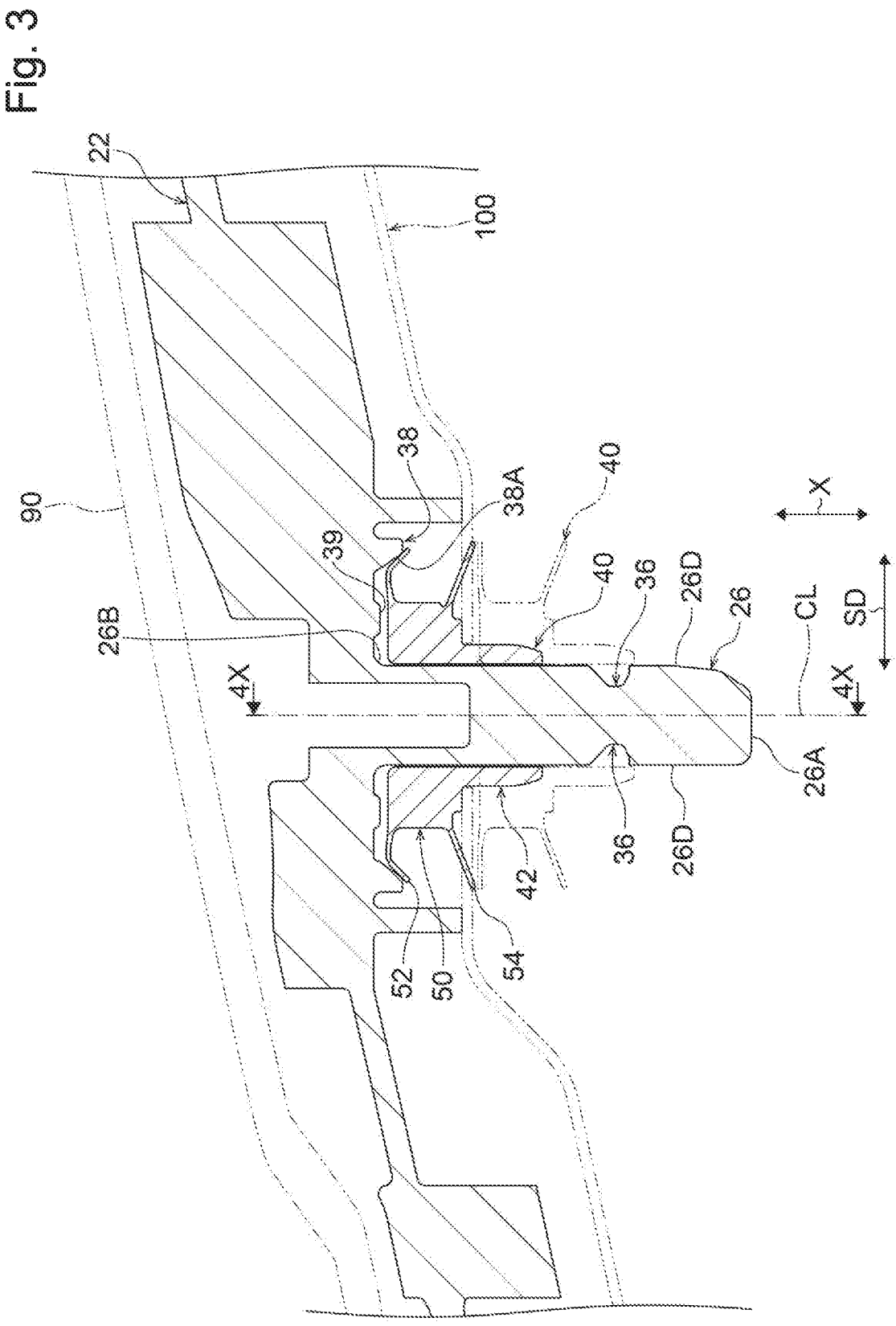
FIG. 3 is an enlarged view of a portion indicated by an arrow 3X in FIG. 2.

As shown in FIG. 2 and FIG. 3, a clip 20 of the invention is a part used to attach a vehicle part (as an example, a bumper) 90 to a vehicle body (as one example, a body panel) 100. Incidentally, the vehicle body 100 of the embodiment is one example of the attachment member disclosed herein.

The clip 20 includes a retainer 22 as an example of a first member, and a grommet 40 as an example of a second member.

[Retainer 22]

The retainer 22 is a part attached to the vehicle body 100 in a state of holding a vehicle part 90. In other words, the vehicle part 90 is attached to the vehicle body 100 through the retainer 22. The retainer is made of a synthetic resin. In particular, the retainer 22 of the embodiment is a one piece molded product of a synthetic resin.

Figure 1:
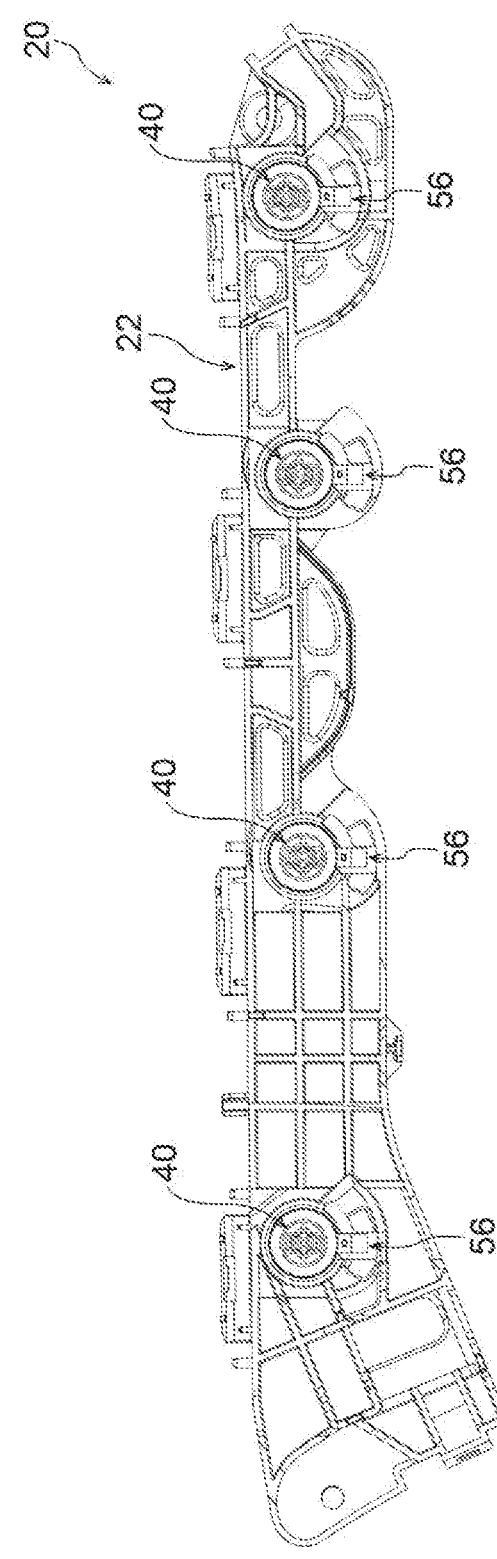
FIG. 1 is a front view of a retainer forming a clip of a first embodiment of the invention seen from a pin side.
Figure 4:
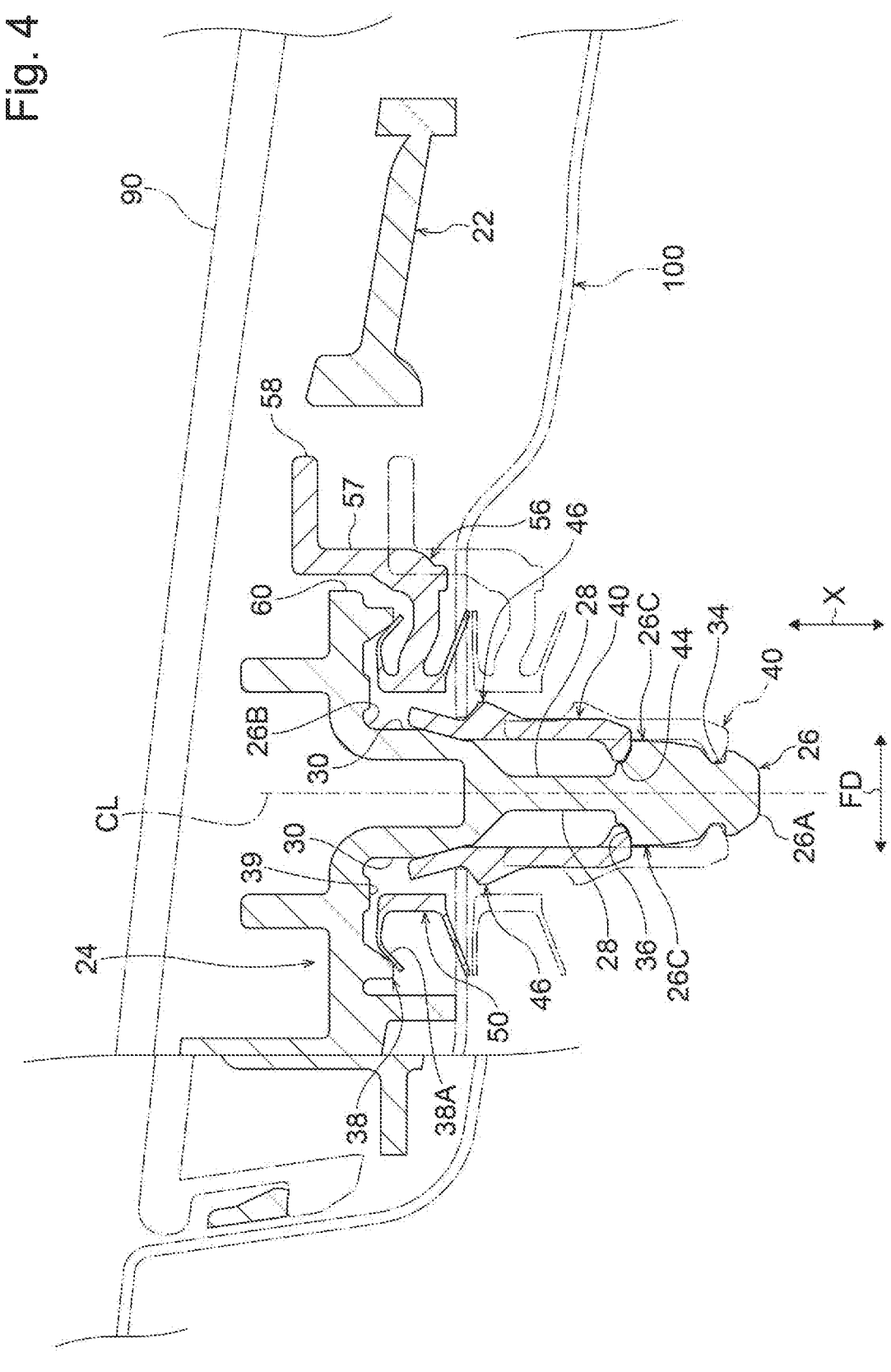
FIG. 4 is a sectional view taken along a line 4X-4X in FIG. 3.
Figure 5:
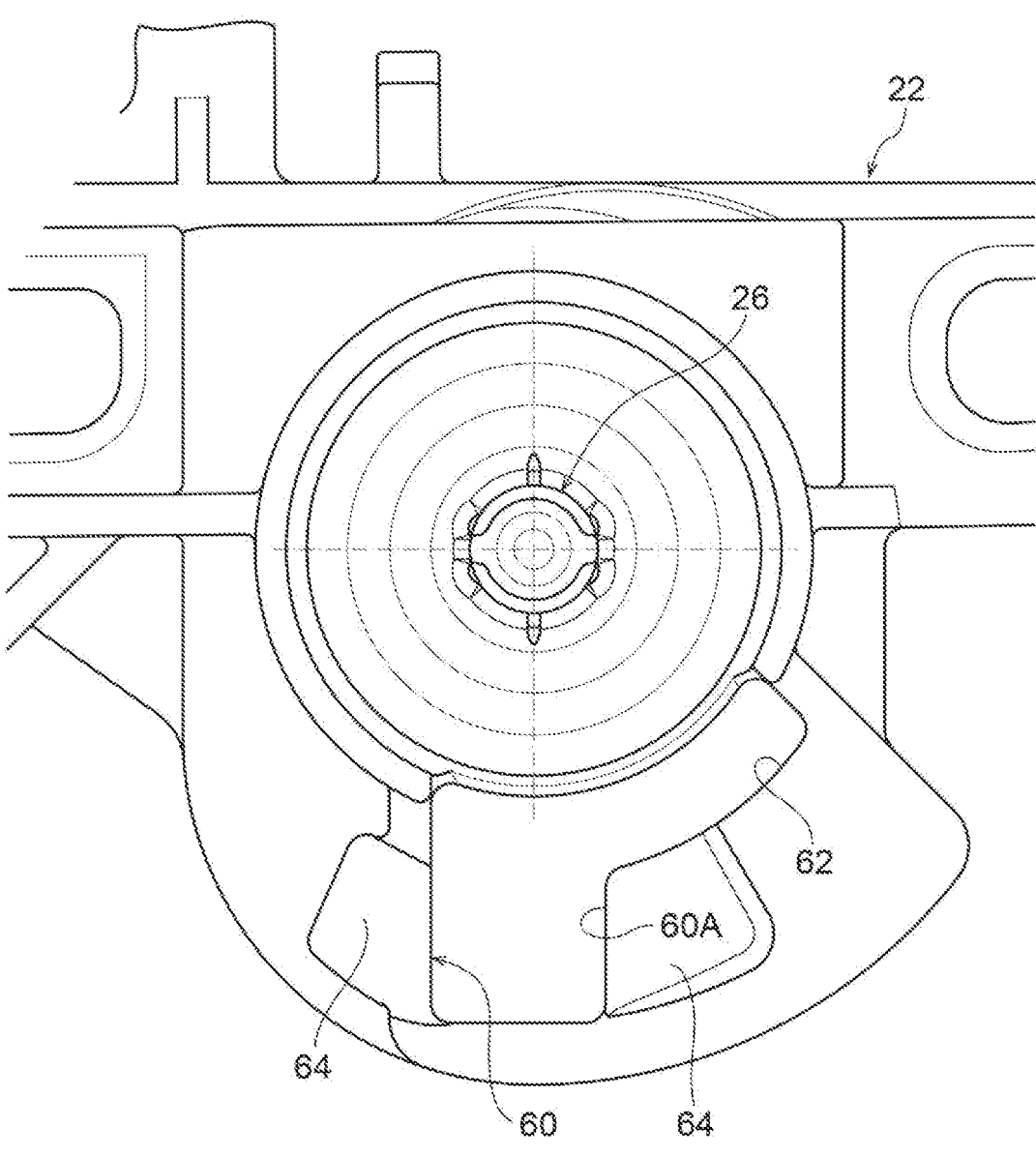
FIG. 5 is an enlarged front view seen around the pin portion of the retainer from the pin side.
Figure 11:
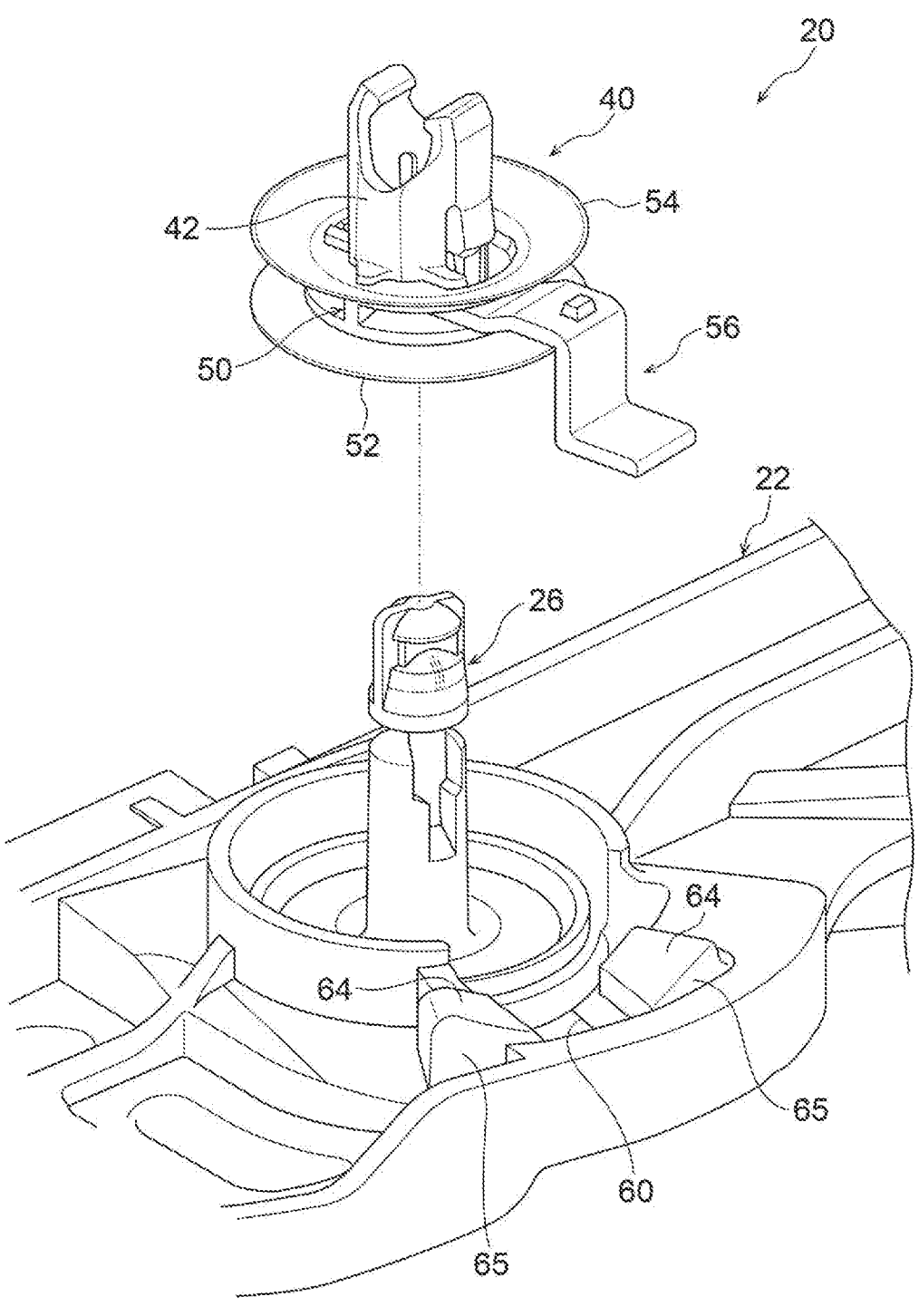
FIG. 11 is a perspective view of the retainer and the grommet, showing a condition before attaching the grommet to the retainer.
Figure 12:
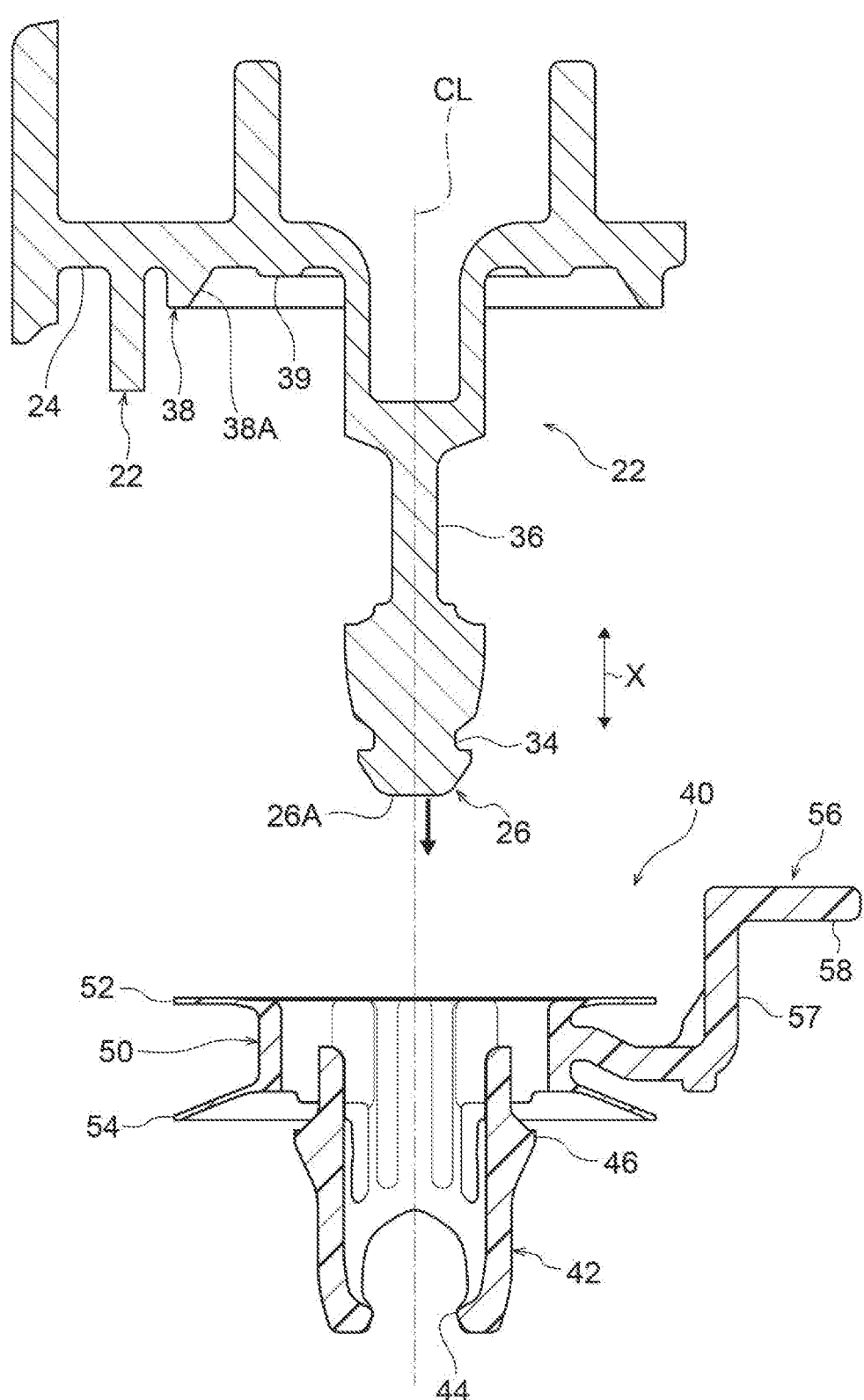
FIG. 12 is a side sectional view of the retainer and the grommet, showing a condition before attaching the grommet to the retainer.
Figure 13:
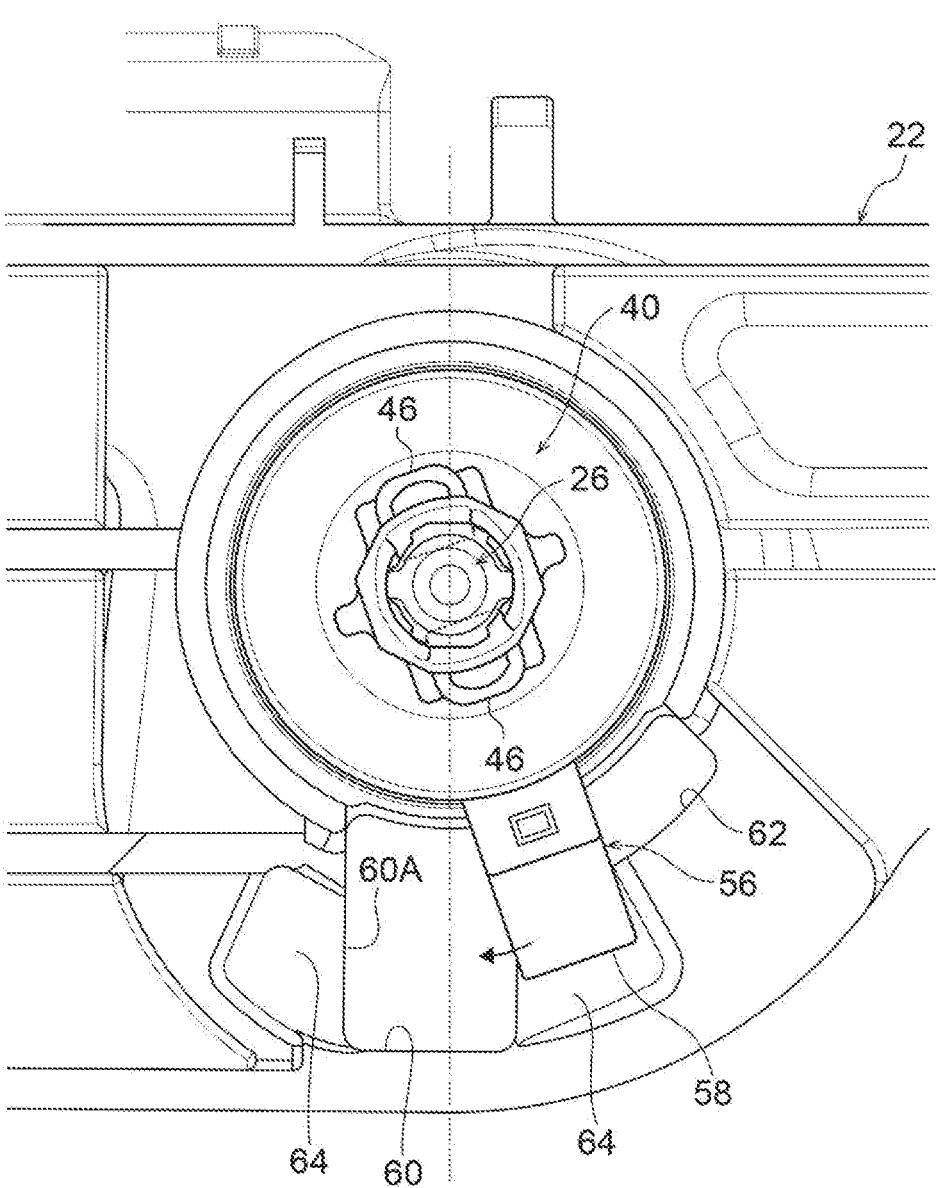
FIG. 13 is an enlarged front view of the retainer and the grommet, showing a condition when the grommet is attached to the retainer.
Figure 14:
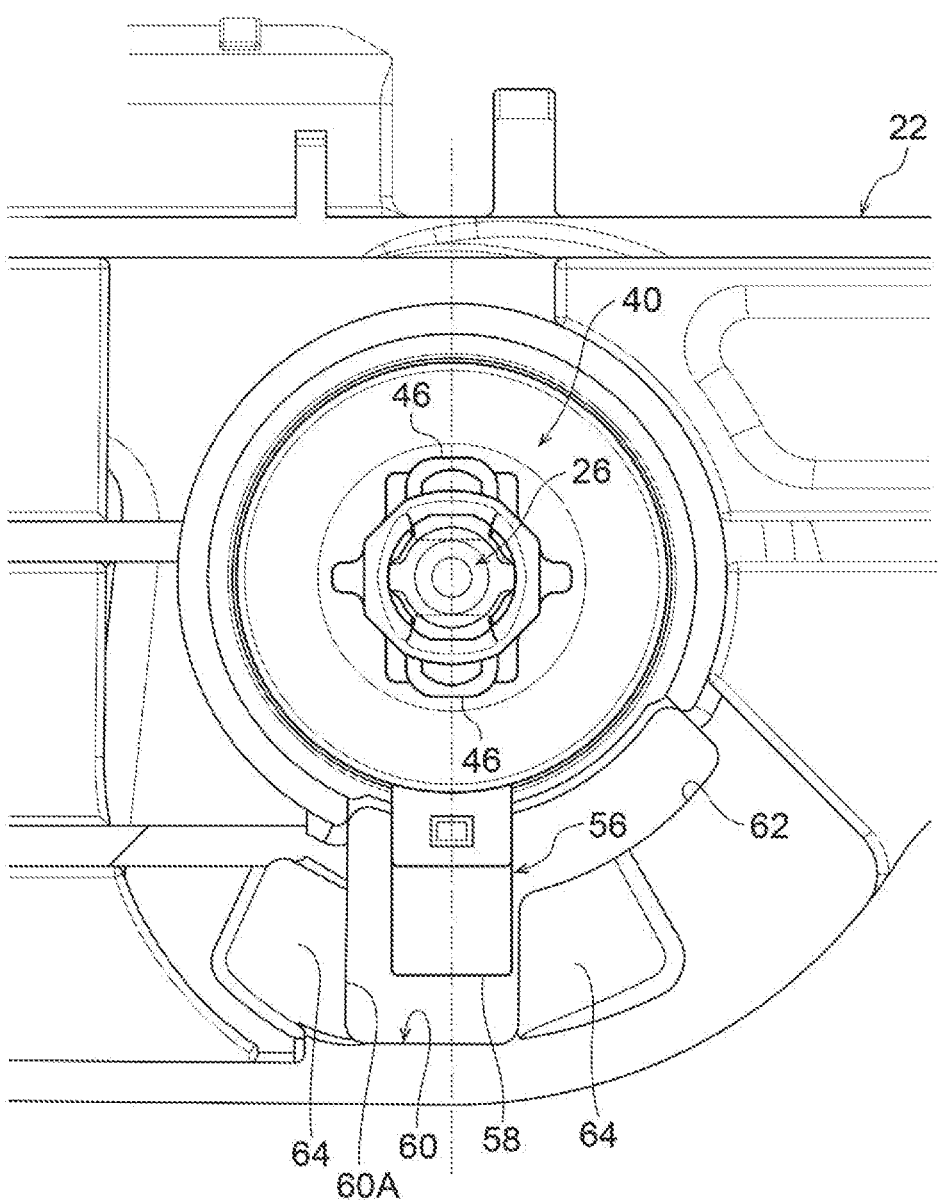
FIG. 14 is an enlarged front view of the retainer and the grommet, showing a condition that the grommet is temporary attached to the pin member of the retainer at a correct position.
Figure 15:
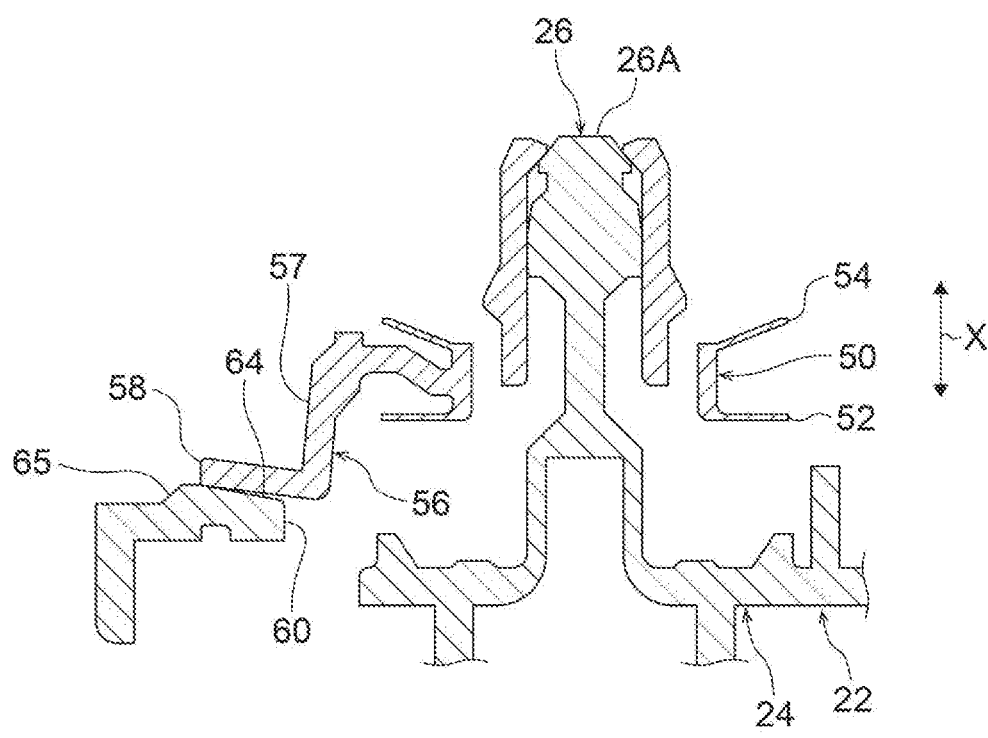
FIG. 15 is a side sectional view of the retainer and the grommet, showing a condition that the grommet is attached to the retainer.
Figure 16:
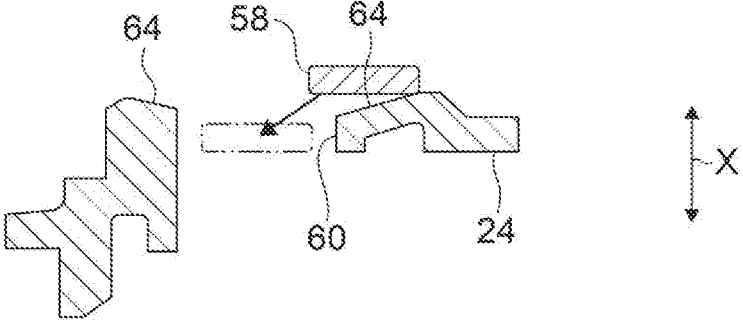
FIG. 16 is a view schematically showing a condition that a tip of an arm portion is guided by a guide member.

As shown in FIGS. 1-3, the retainer 22 includes a base member 24, pin portions 26, an insertion holes 60 (refer to FIG. 4 and FIG. 5) as one example of inserted members, and guide members 64 (refer to FIG. 5 and FIG. 11).

(Base Member 24)

As shown in FIG. 1 and FIG. 2, the base member 24 forms a main part of the retainer 22. Also, the base member 24 is elongated.

(Pin Portions 26)

As shown in FIG. 1 and FIG. 2, the pin portions 26 are formed plural spaced apart from each other along the longitudinal direction of the base member 24. As one example of the embodiment, the base member 24 has four pin portions 26. The pin portions 26 protrude in a thickness direction of the base member 24 (refer to FIG. 2).

As shown in FIG. 11, a sectional shape of the pin portion 26 is rod-shaped with about circular shape. Hereinbelow, a shaft direction of the pin portion 26 is explained appropriately as an axis direction X.

As shown in FIG. 4, in a pair of side portions 26C facing a first direction (FD direction in FIG. 4) perpendicular to the axis direction of the pin portion 26, there are respectively provided permissible portions 28 and preventive portions 30 between one end portion 26A (in other words, a tip portion in a projection direction) positioned on one side (lower side in FIG. 4) in the axis direction X of the pin portion 26, and the other end portion 26B (in other words, a base end portion in the projection direction) located on the other side (upper side in FIG. 4). In concrete, the permissible portions 28 are provided on the one end portion 26A side, and the preventive portions 30 are provided on the other end portion 26B side more than the permissible portions 28 of the pin portion 26.

Figure 17:
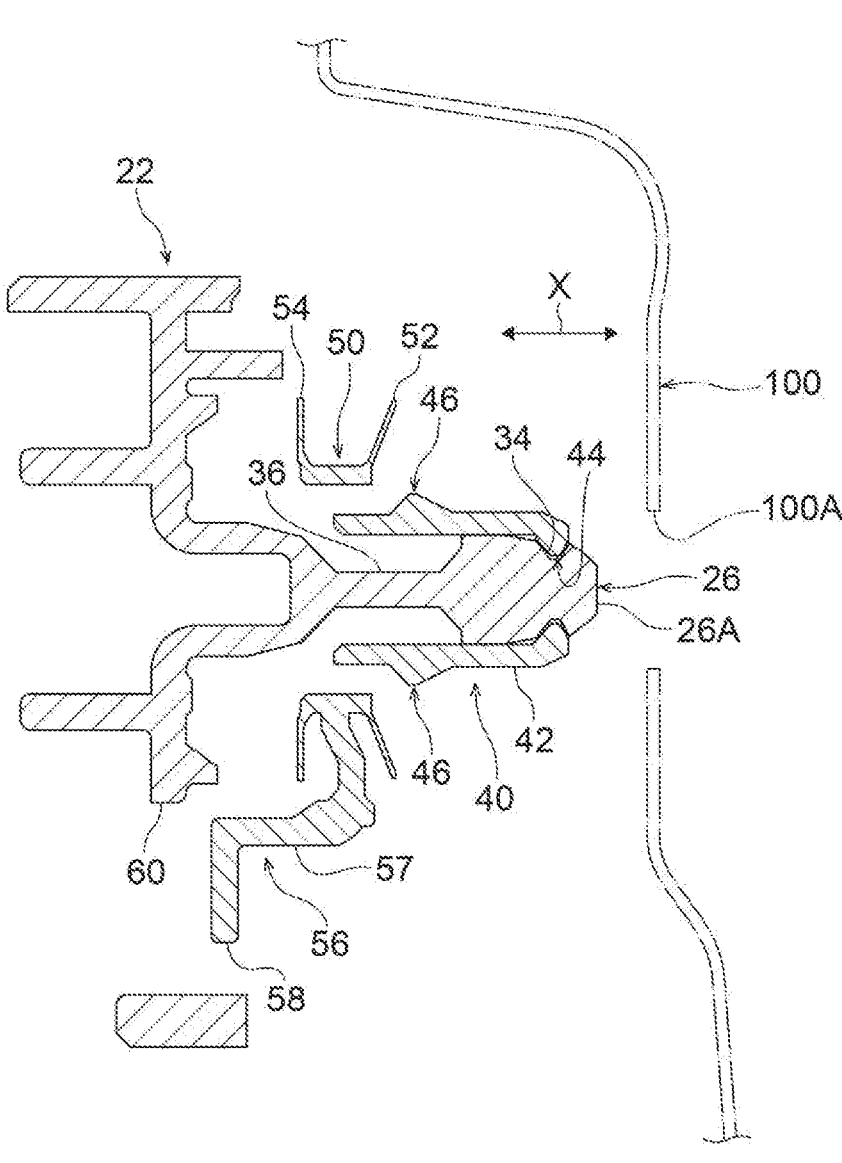
FIG. 17 is an enlarged side view of the retainer and the grommet, showing a condition that the grommet is temporary attached to the pin member of the retainer at a correct position.
Figure 18:
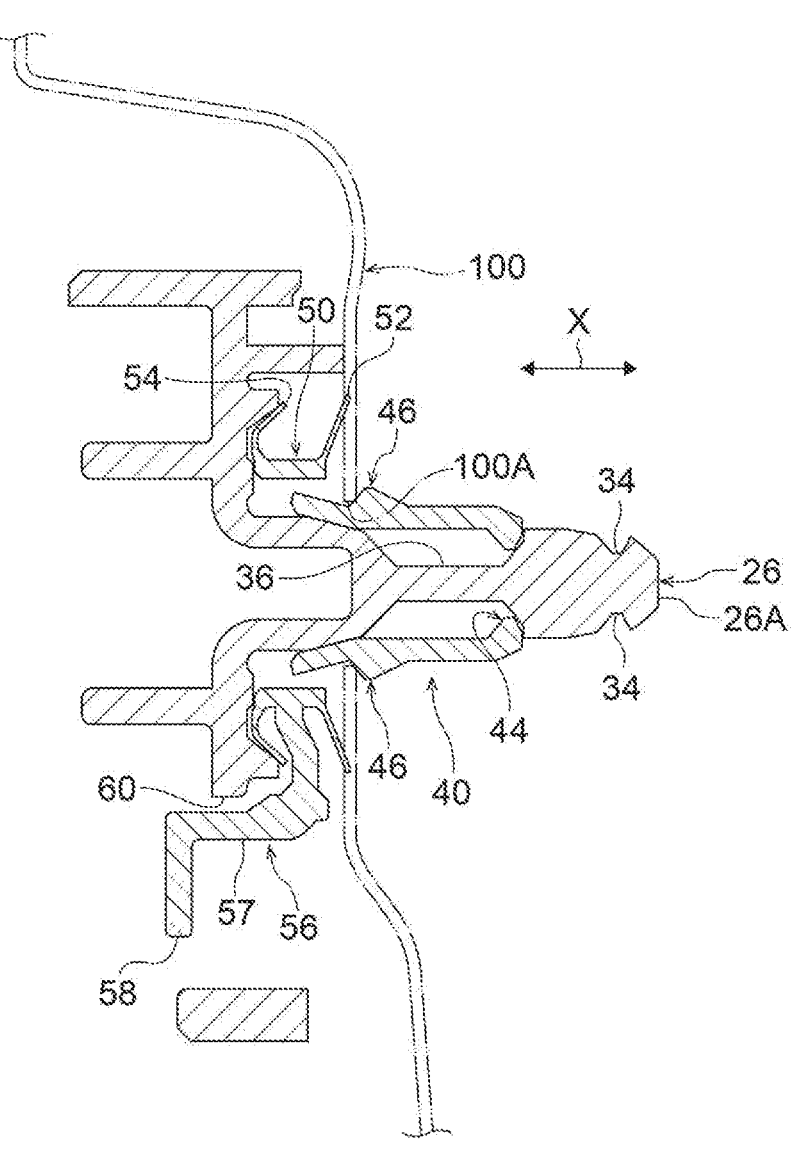
FIG. 18 is an enlarged side view of the retainer and the grommet, showing a condition that the grommet is temporary attached to a vehicle body.
Figure 19:
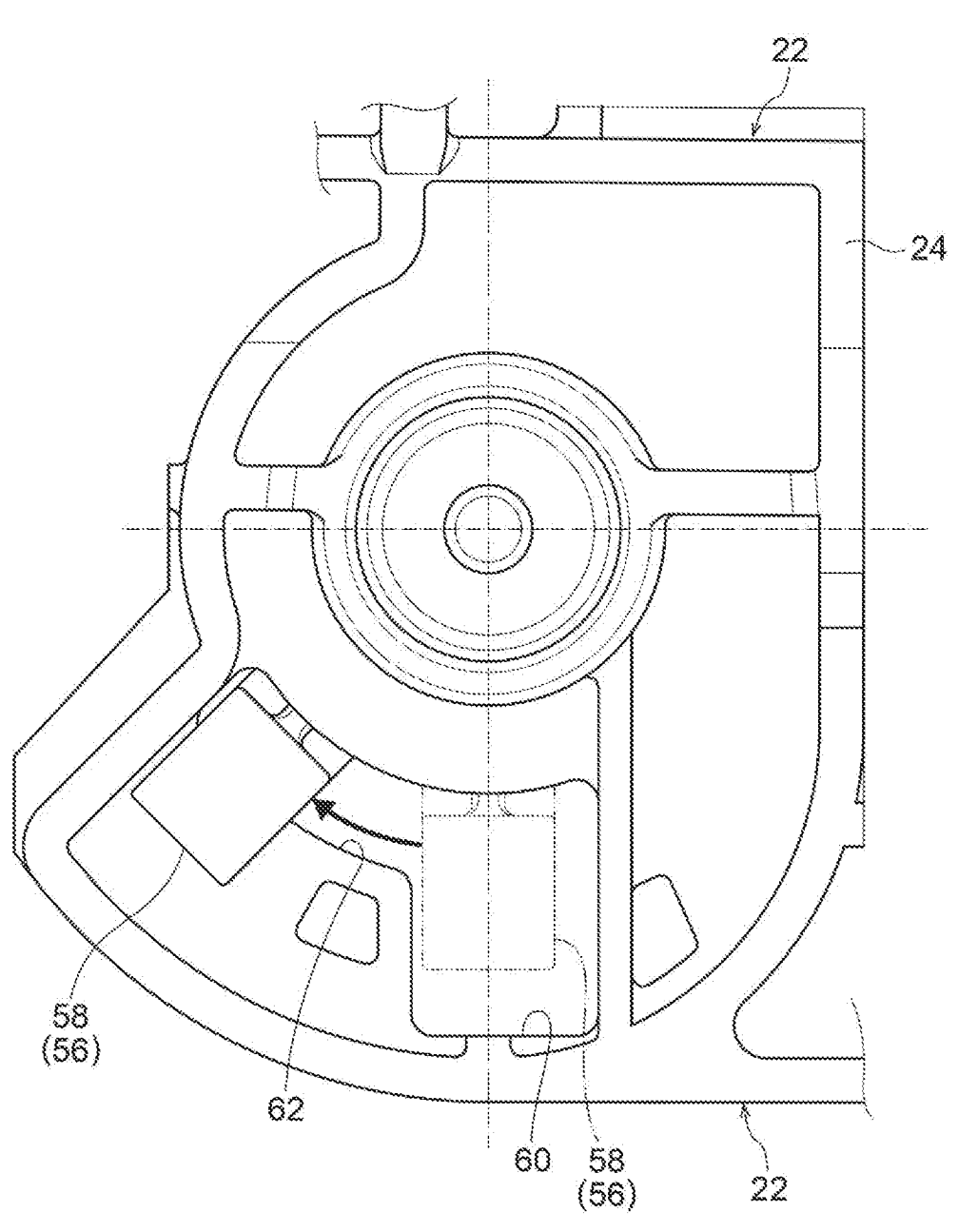
FIG. 19 is a rear view of the retainer seen from an opposite side of the pin portion, showing a condition that the grommet is permanently attached to vehicle body.
Figure 20:
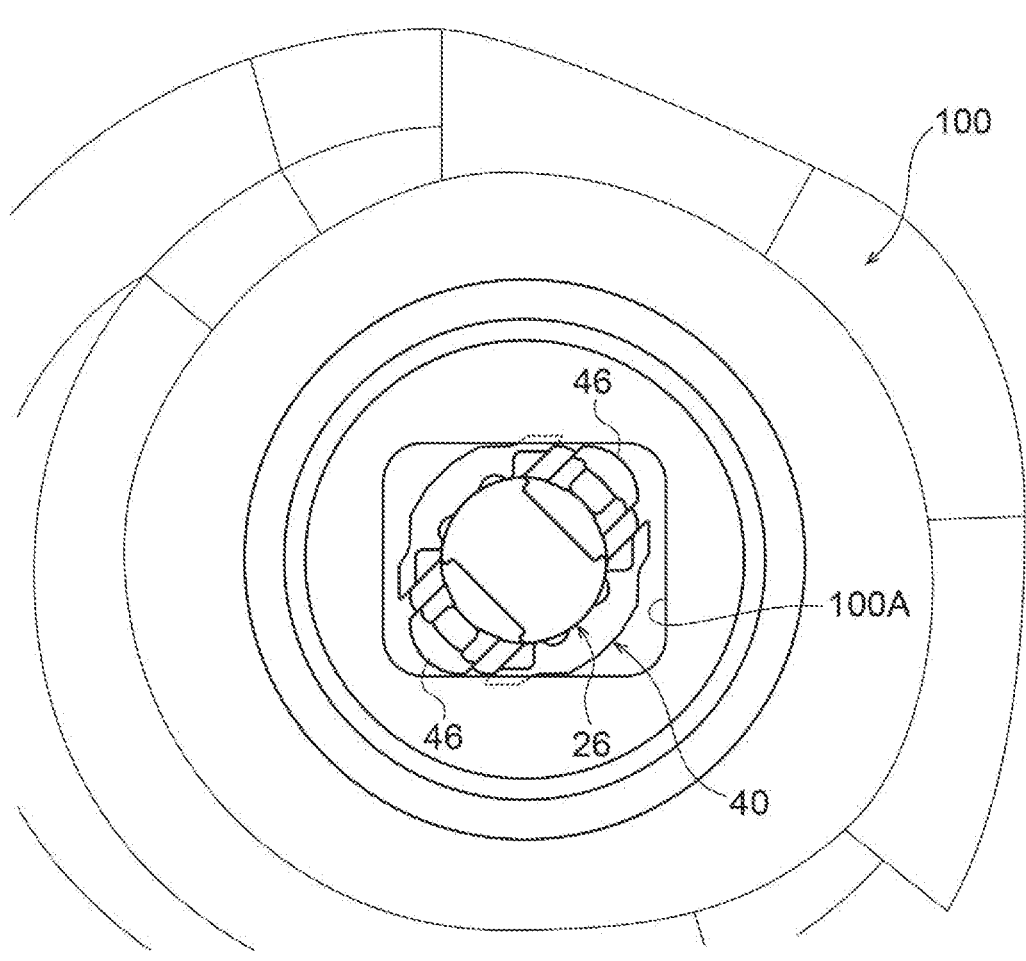
FIG. 20 is a rear view of the retainer, showing a condition that the operation lever is in a first rotational position.
Figure 21:
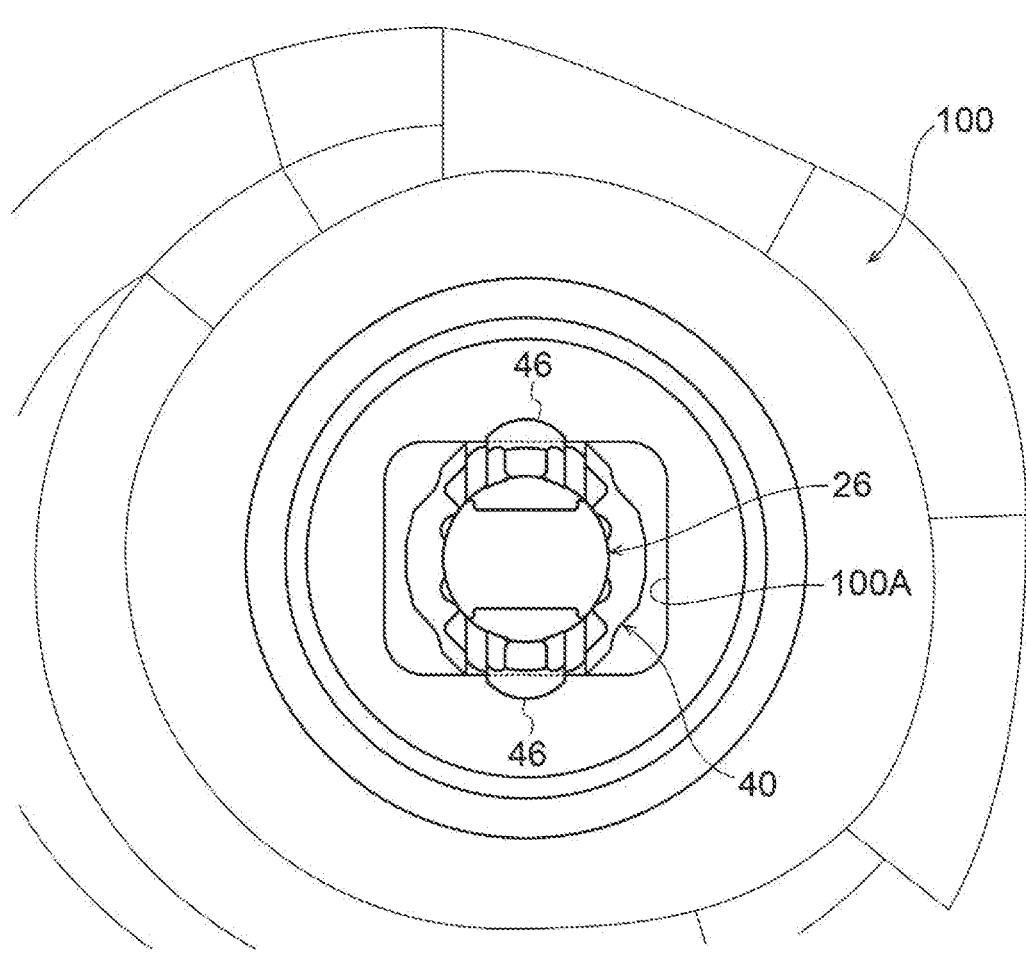
FIG. 21 is a rear view of the retainer, showing a condition that the operation lever is in a second position.

As shown in FIG. 4, the permissible portion 28 is a dent shape portion formed on a side portion 26C of the pin portion 26, and is a portion, as shown in two dotted chain lines in FIG. 4, which permits elastic deformation of an engaging claw 46 explained later into an inside of a tube portion (inner side of the tube portion 42) when the grommet 40 is located in a first insertion portion (refer to FIG. 17). Here, the elastic deformation to the tube inside the engagement claw 46 of the grommet 40 means that the engagement claw 46 elastically deforms toward a shaft center AL side. Incidentally, the elastic deformation of the engagement claw 46 of the grommet 40 toward the tube outside mans that the engagement claw 46 elastically deforms to a side opposite to the shaft center AL side of the tube 42 of the grommet 40.

As shown in FIG. 4, the preventive portions 30 are raised portions provided on the pin portion 26 (in the present embodiment, portions raised from a surface of the side portion 26C), and prevent elastic deformation of the engagement claw 46 to the tube inside by supporting the engagement claw 46 from the tube inside.

As shown in FIG. 4, in the pair of side portions 26C of the pin portion 26, an engagement dent 34 and an engagement dent 36, to which the engagement claws 44 of the grommet 40 engage, are provided between the one end portion 26A and the other end portion 26B in the axis direction X of the pin portion 26. In concrete, the engagement dent 34 is provided on the one end portion 26A side of the pin portion 26, and the engagement dent 36 is provided on other end portion 26B side more than the engagement dent 34 of the pin 26.

The engagement dent 34 is a dent shape portion provided on the side portion 26D of the pin portion 26, and is a portion to which an engagement claw 44, explained later, of the grommet 40 engages.

The engagement dent 36 is a dent shape portion provided on the side portion 26D of the pin portion 26, and is a portion to which the engagement claw 44 of the grommet 40 engages. Also, the engagement dent 34 is provide on the side portion 26C of the pin portion 26. Namely, the engagement dent 34 is an annular dent portion formed continuously around the pin portion 26.

Around a peripheral portion 24A of the pin portion 26 of the base member 24, as shown in FIG. 3 and FIG. 4, an annular projection portion 38 is provided to surround the pin portion 26. The annular projection portion 38 is a projection in the annular shape projecting along the axis direction X from the pin 26 side of the peripheral portion 24A. Also, in the annular projection portion 38, an edge at the inside in the diameter direction is made to have a tapered surface 38A. In the annular projection 38, a seal portion 52, explained later, of the grommet 40 contacts.

Also, in the peripheral portion 24A, an annular projection portion 39 is provided to surround the pin portion 26 diametrically inside the annular projection portion 38, The annular projection portion 39 has a projection height less than the annular projection portion 38. The annular projection 39 contacts a flange portion 50, explained later, of the grommet 40, so that excessive insertion of the pin portion 26 relative to the grommet 40 is limited.

As sown in FIG. 5, an insertion hole 60 is a through hole formed in the base member 24. The insertion hole 60 is formed in the base member 24 outside the diametric direction of the annular projection 38. An operation portion 58 of an operation lever 56 of the grommet 40 is inserted into the insertion hole 60. Also, a slit 62 extends parallel to the annular projection portion 38 from a portion at the pin portion 26 side of the insertion hole 60. The slit 62 ends in the middle. Also, the arm portion 57 of the operation lever 56 is inserted into the slit 62. Here, when the operation lever 56 is operated (rotational operation) when the pin 26 is in the second insertion position, the arm 57 moves along the slit 62.

As shown in FIG. 5 and FIG. 11, the guide portions 64 are portions guiding the operation portion 58 to the insertion hole 60 by contacting the operation portion 58 of the lever 56 when the pin portion 26 is inserted into the tube portion 42. The guide portions 64 are formed around the insertion hole 60 in the base member 24. In concrete, the guide portion 64 is an inclined face inclining to an opening edge 60A of the insertion hole 60. The guide portion 64 is arranged on a rotational rotation trajectory of the operation portion 58 with a center in the tube portion 42. Also, the guide portions 64 are arranged on two sides with the insertion hole 60 therebetween. As one example, in the present embodiment, the surrounding portion of the insertion hole 60 of the base member 24 includes projection portions 65 projecting in the same direction as the pin portion 26. The inclined face as the guide portion 64 is provided at a portion on the insertion hole 60 side in the projection portion 65.

The "inclined face" herein is a face inclining to the axis direction of the pin portion 26, and is not particularly limited. For example, it may be a plane face, a curved face, an inclined face with steps. Incidentally, the inclined face in the embodiment is an inclined plane face inclining to the axial direction of the pin portion 26.

[Grommet 40]

The grommet 40 is a member attached to the pin portion 26 of the retainer 22 and an attachment hole 100A of a vehicle body 100. Namely, the grommet 40 is a member to attach the retainer 22 to the vehicle body 100. The grommet 40 is made of a synthetic resin. In concrete, the grommet 40 of the embodiment is a one piece molded product of a synthetic resin.

As shown in FIG. 5, the grommet 40 comprises the tube portion 42, the engagement claws 44 and engagement claws 46.

(Tube Portion 42)

As shown in FIG. 6 to FIG. 11, the tube portion 42 has a cylindrical shape with about circular shape in section, and the pin portion 26 of the retainer 22 can be inserted in the inside. Namely, an inner shape of the tube portion 42 is made to correspond to an outer shape of the pin portion 26. Accordingly, the tube portion 42 can relatively rotate to the pin portion 26 with the pin portion 26 as a center. Also, the tube portion 42 can be inserted into an attachment hole 100A formed in the vehicle body 100. Incidentally, the attachment hole 100A of the embodiment is a through hole with about a rectangular shape (in concrete, a square with rounded edges). Also, in the following, a tube axis direction of the tube portion 42 is indicated as Y, and a center axis of the tube portion 42 is indicated as AL. In a state that the grommet 40 is attached to the retainer 22, since the central axis CL of the pin portion 26 of the retainer 22 generally coincides with the center axis AL of the tube portion 42 of the grommet 40, in the drawings showing the attachment condition, the center axis CL and the axis direction X are only shown, and the center axis AL and the tube axis direction Y are omitted.

(Engagement Claw 44)

Figure 6:
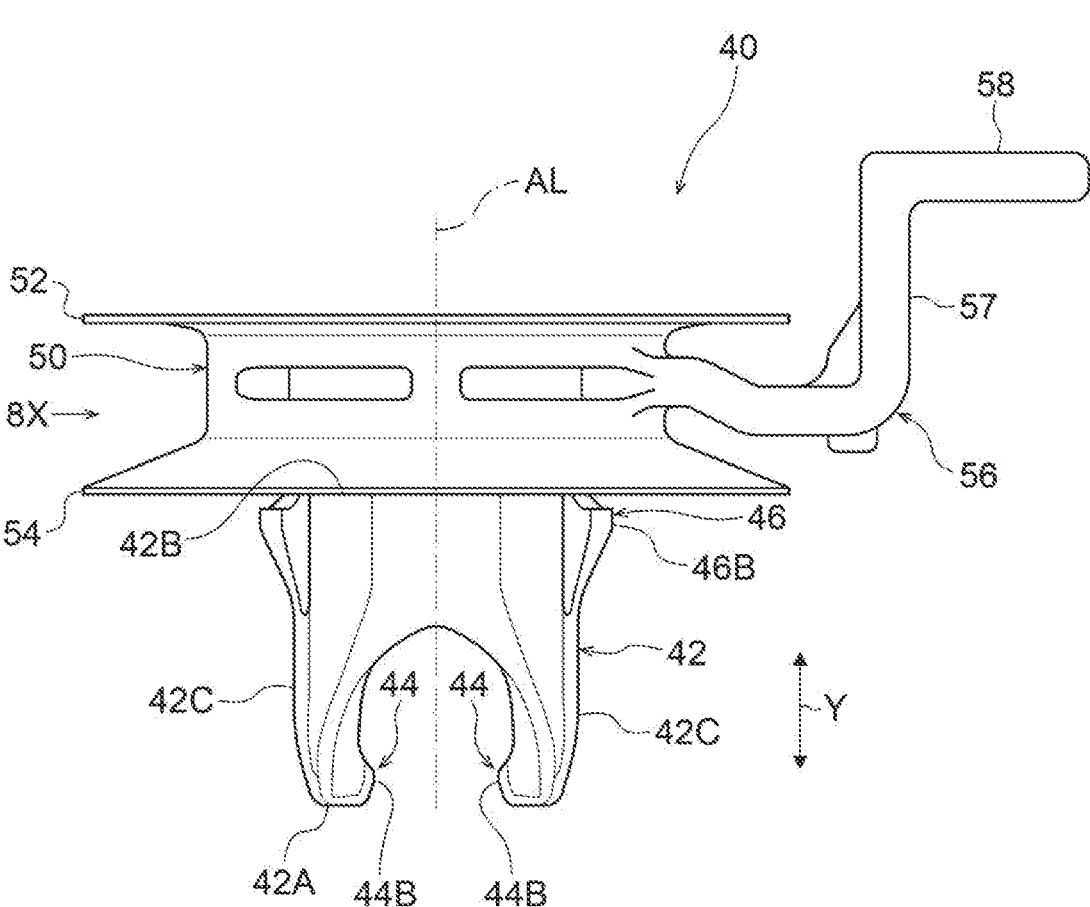
FIG. 6 is a side view of a grommet forming the clip of the first embodiment of the invention.
Figure 7:
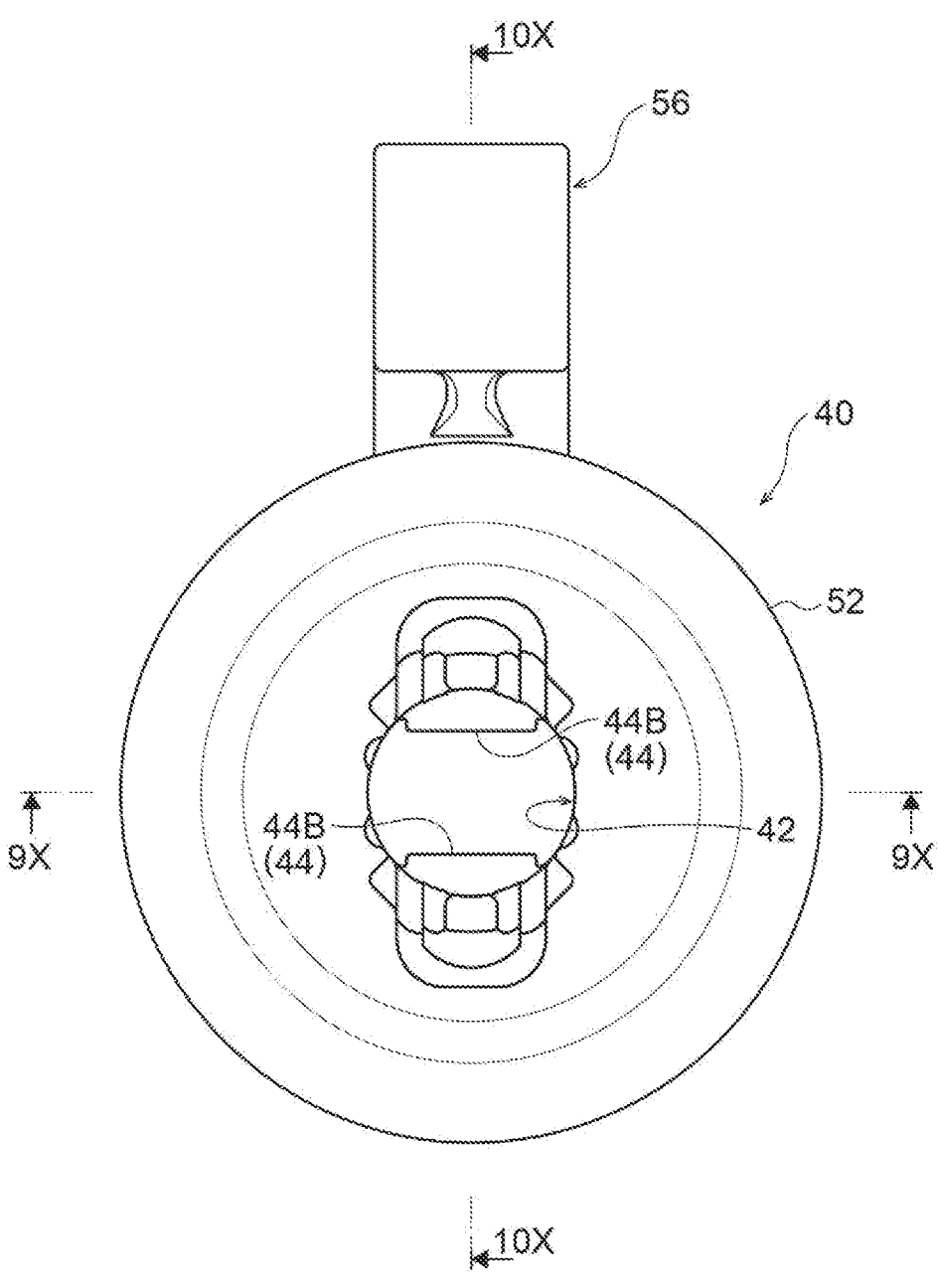
FIG. 7 is a plan view of the grommet of FIG. 6.
Figure 8:
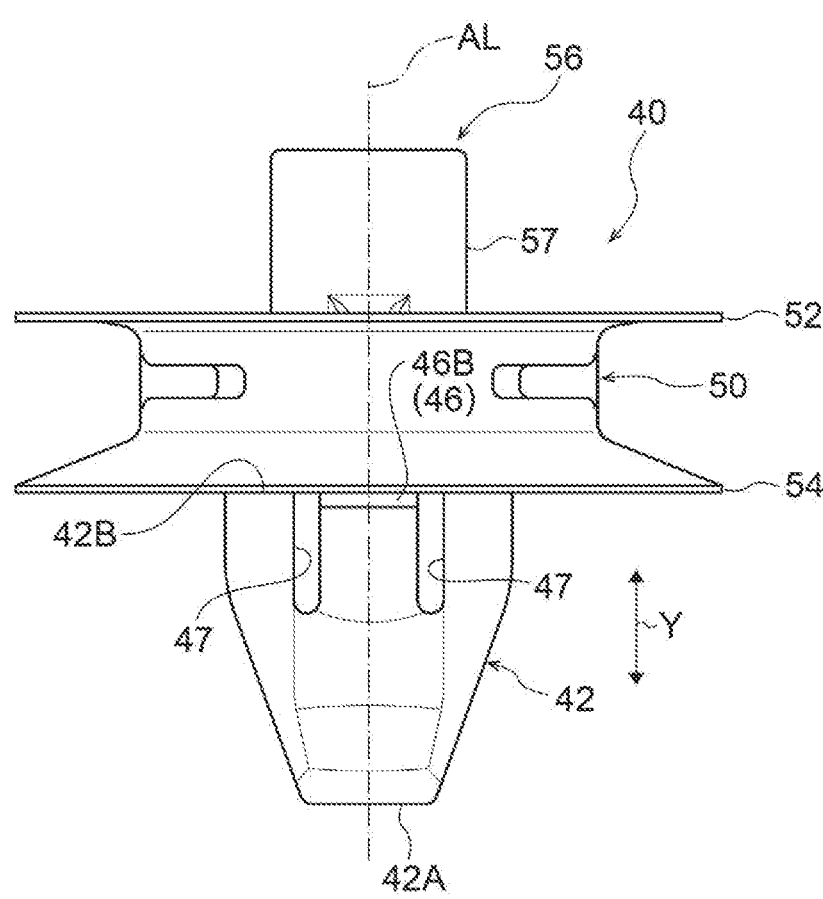
FIG. 8 is a side view of the grommet seen from a direction of an arrow 8X in FIG. 6.
Figure 9:
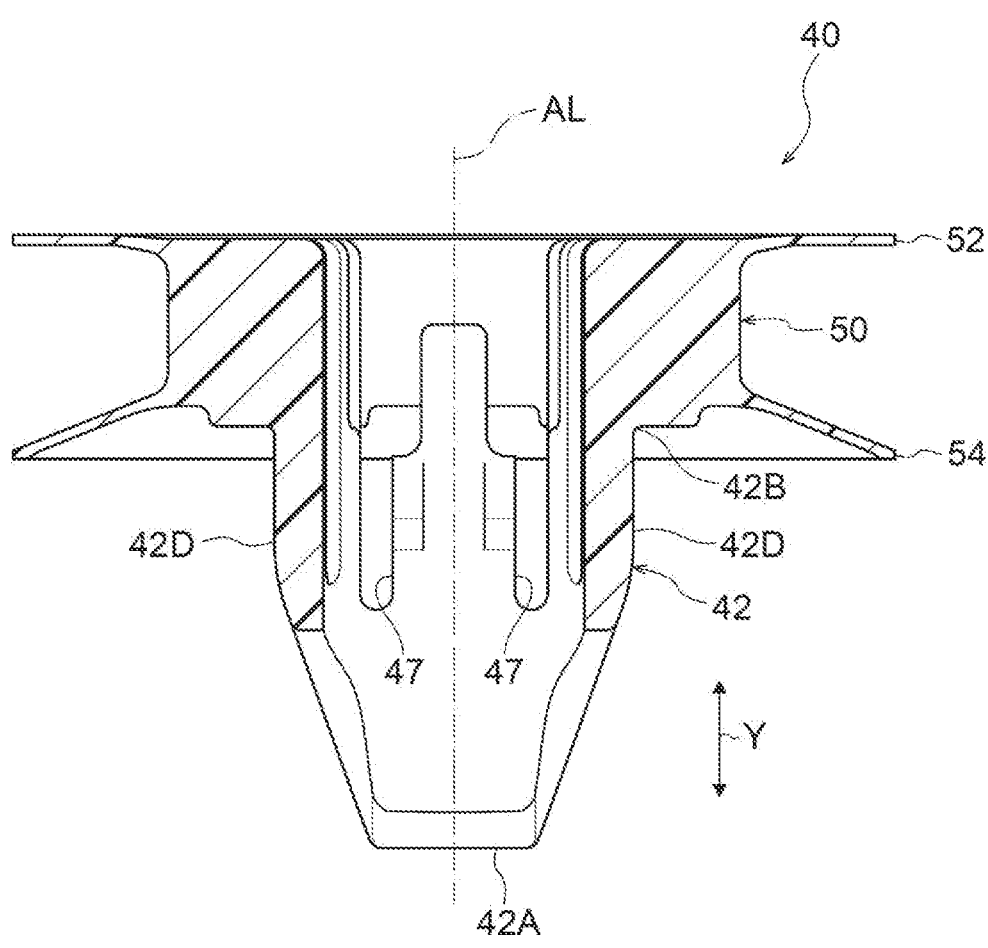
FIG. 9 is a sectional view taken along a ling 9X-9X in FIG. 7.
Figure 10:
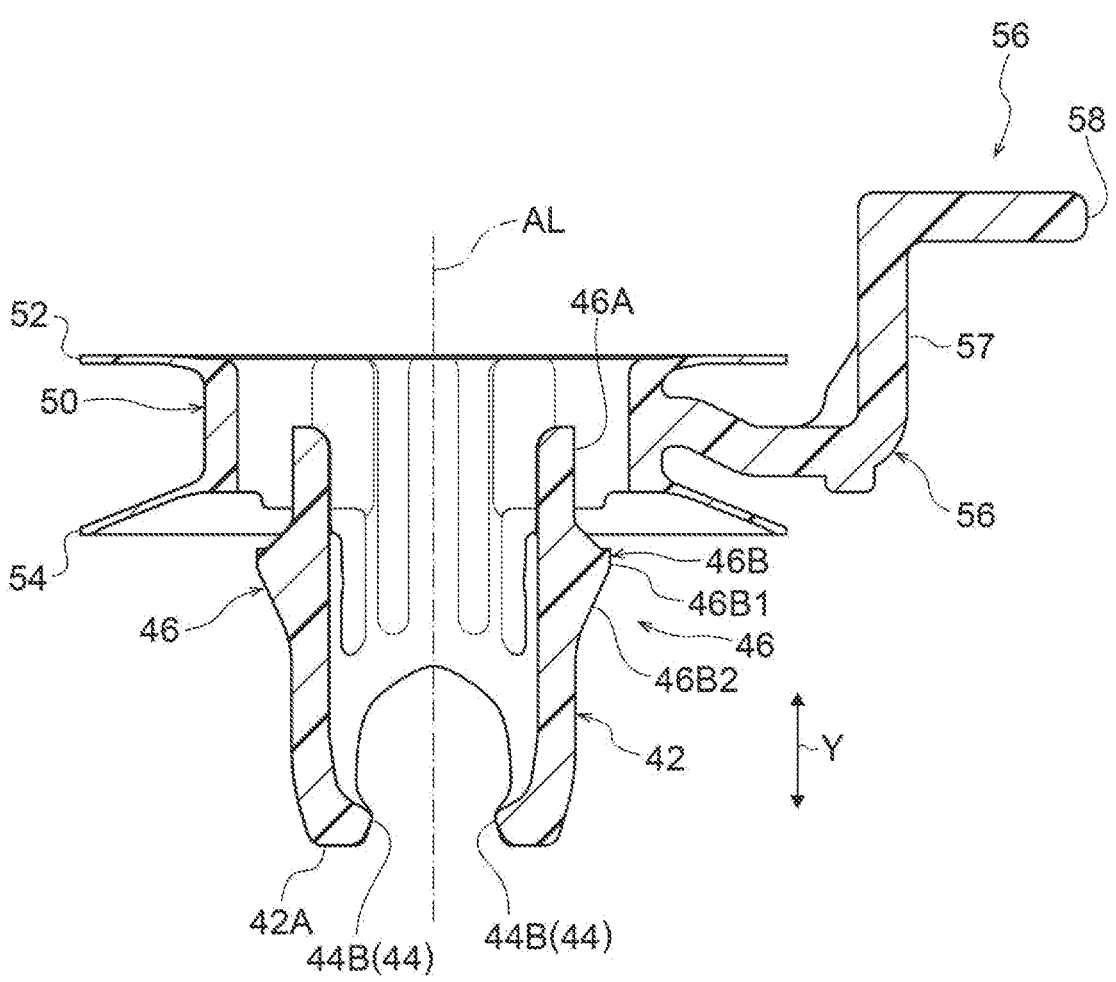
FIG. 10 is a sectional view taken along a line 10X-10X in FIG. 7.

As shown in FIG. 6 and FIG. 10, engagement claws 44 are respectively provided at a pair of side portion 42C facing the side portions 26C of the pin portion 26 in a state that the grommet 40 is attached to the retainer 22 (including the temporary attachment and final attachment). The engagement claw 44 projects from a tip of the side portion 42C to an inner side of the tube portion 42. Incidentally, in the present embodiment, in the pair of side portions 42C facing the pair of side portions 26C of the pin portion 26, a cut portion is formed from a one end of the tube axis direction Y of the tube portion 42 to about a middle portion. The tip of the side portion 42C becomes a free end by the cut portion.

(Engagement Claw 46)

In a state that the grommet 40 is attached to the retainer 22 (including the temporary attachment and final attachment), engagement claws 46 are respectively provided on the pair of side portions 42C facing the pair of side portions 26C of the pin portion 26. The engagement claw 46 is a plate portion formed between two slits 47 extending from the other end 42B of the tube portion 42 in the tube axial direction to one end portion 42A side thereof, and is elastically deformable. The engagement claw 46 is supported in a one side supporting condition where the other end (end at the other end side) in the tube axis direction Y is a fixed end connected to the side portion 42D and the one end (end at one end side) in the tube axis direction Y is a free end. Also, the engagement claw 46 includes a straight portion 46A extending from the one end in the tube axis direction Y along the tube axis direction Y, and a claw portion 46B which is a raised portion projecting from an outer surface of the raised portion 46A in a direction away from the shaft center AL. A cross sectional shape of the claw portion 46B has a mountain shape having a top portion 46B1 and an inclined portion 46B2 continuing to both sides of the top portion 46B1. Here, after the claw portion 46B of the engagement claw 46 being elastically deformed and passing through the attachment hole 102 of the vehicle body 100, the straight portion 46A elastically returns and the claw portion 46B engages an edge if the attachment hole 102.

Incidentally, in the present embodiment, the pin portion 26 is formed such that when the pin portion 26 is in the first insertion position, the permissible portion 28 is located in the inner sides of the tube portion of the engagement claw 46, and when the pin portion 26 is in the second insertion position, the preventive portion 30 is located in the inner side of the tube of the engagement claw 46. Accordingly, when the pin portion 26 is located in the first insertion position, since the permissible portion 28 is located inside the tube, the engagement claw 46 is permitted to elastically deform to the tube inside. Also, when the pin portion is located in the second insertion portion, since the preventive portion 30 is located inside the tube portion 42, the inner portion of the tube portion 42 is supported by the preventive portion 30 to prevent the elastic deformation to the inside of the tube 42. Further, when the pin portion 26 is in the first insertion position, a side face of the operation portion 58, explained later, faces a hole wall of the insertion hole 60. Accordingly, when the pin portion 26 is located in the first insertion position, since the operation portion 58 contacts the hole wall of the insertion hole 60, rotation of the tube portion 42 relative to the pin portion 26 by mistake is suppressed.

As shown in FIG. 10 and FIG. 11, the grommet 40 includes a flange portion 50, a seal portion 52, and a seal portion 54.

The flange portion 50 is a circular annular portion overhanging to a direction perpendicular to the tube axis direction Y from the other end portion 42B of the tube portion 42.

The seal portion 52 is a portion overhanging from an outer periphery of the flange portion 50, and is a circular annular portion with a thickness thinner than that of the flange portion 50. The seal portion 52 is elastically deformable, and when the pin portion 26 is located in the second insertion position, and the seal portion 52 contacts an annular projecting portion 38 (in detail, a taper face 38A), and seals between the retainer 22 and the grommet 40.

The seal portion 54 is a portion overhanging from an outer periphery of the flange portion 50, and is a circular annular portion having a thickness less than that of the flange portion 50. Incidentally, the seal portion 54 is arranged on one side portion (one end portion 42A side of the tube portion 42) in the tube axis direction Y more than the seal portion 52. The seal portion 54 is elastically deformable, and when the tube portion 42 is inserted into the attachment hole 100A, the seal portion 54 contacts a periphery of the attachment hole 100A, and seals between the grommet 40 and the vehicle body 100.

Also, as shown in FIG. 11, the grommet 40 is provided with an operation lever 56 for rotating the tube portion 42 to the pin portion 26. The operation lever 56 includes an arm portion 57, which extends from the tube portion 42 outwardly in the diameter direction, bends in the middle and extends in the axial direction of the tube portion 42. In concrete, the operation lever 56 includes the arm portion 57 in a plate shape, which overhangs outwardly in the diameter direction of the flange portion 56 from the outer periphery of the flange portion 50 and between the seal portion 52 and the seal portion 54, and extends in the middle to the other side of the tube direction Y. A tip of the arm portion 57 is bent back to a direction perpendicular to the tube axis direction and forms the operation portion 58. When the operation lever 56 is in a first rotation position (a position shown in FIG. 20), the engagement claw 46 and the edge of the attachment hole 100A disengage, and when the operation 56 is in a second rotation portion (a position shown in FIG. 21), the engagement claw 46 and the edge of the attachment hole 100A engage. As an example, when the operation lever 56 is rotated from the second rotation position to the first rotation position, the tube portion 42 rotates relative to the pin portion 26, a pair of engagement claws 46 aligns in a diagonal line of the attachment hole 100A, and the pair of engagement claws 46 is located inside the attachment hole 100A. In this state, the tube portion 42 can be removed from the vehicle body 100.

Also, the attachment hole 100A of the vehicle body 100 includes a first area having a size such that the tube portion 42 can be inserted without elastically deforming the engagement claws 46, and a second area which is located adjacent the first area, and has a size such that the tube portion 42 can be inserted by elastically deforming the engagement claws 46, the size being smaller than that of the first area. Here, since the attachment hole 100A of the embodiment is about square shape, the first area is on the diagonal line, and the second area is a portion between two sides facing each other. Incidentally, the present disclosure is not limited to this. For example, the attachment hole 100A may be an ellipse, a long hole and so on.

The clip attachment structure of the embodiment is formed by the vehicle body where the attachment hole is formed, and the clip 20 attached to the vehicle body 100.

An insertion direction of inserting the pin portion 26 of the retainer 22 to the tube portion 42 of the grommet 40 is a direction along the axis direction X and indicated by numeral "1". Also, the insertion direction of inserting the tube portion 42 of the grommet 40 to the attachment hole 100A of the vehicle body 100 is a direction along the tube axis direction Y, and is the same direction inserting the above pin portion 26 to the tube portion 42, so that the same numeral "1" is used.

Next, the operation and advantages of the embodiment are explained.

In the clip 20, at first, the pin portion 26 of the retainer 22 is inserted into the first insertion position inside the tube portion 42 of the grommet 40. When the pin portion 26 is inserted into the first insertion position, the pin portion 26 engages the engagement claws 44. In concrete, the engagement claws 44B of the engagement claws 44 of the tube portion 42 enter the engagement dents 34 of the pin portion 26, and the engagement dents 34 and the engagement claws engage. In this engagement, the movement in the extraction direction of the pin portion 26 relative to the tube portion 42 is limited. In this way, when the pin portion 26 is in the first insertion position, since the engagement dents 34 and the engagement claws 44 engage together, the temporary attachment state between the retainer 22 and the grommet 40 is held.

Next, the retainer 22 is pushed to insert the tube portion 42 of the grommet 40 to the attachment hole 100A of the vehicle body 100. Here, when the tube portion 42 is inserted into the attachment hole 100A, since the operation lever 56 of the grommet 40 is in the first rotation position, the tube portion 42 of the grommet 40 is smoothly inserted into the attachment hole 100A. And, when the retainer 22 is further pushed to the vehicle body 100 side in a state that the flange 50 is in contact to the periphery of the attachment hole 100A of the vehicle body 100, the pin portion 26 reaches the second insertion position. When the pin portion 26 reaches the second insertion position, the engagement claw 46 is supported from the inside of the tube portion 42 by the preventive portions 30, so that the inward elastic deformation of the engagement claw 46 of the tube portion 42 is prevented. Further, in the present embodiment, when the pin portion 26 is in the second insertion position, the engagement claws 46 are pushed outside the tube portion 42 by the preventive portions 30. In this condition, when the operation lever 56 is rotated from the first rotation position to the second rotation position, the claw portion 46B engages the edge of the attachment hole 100A (refer to FIG. 20). By the engagement, escaping from the attachment hole of the grommet 40 is suppressed. As above, in the present embodiment, when the pin portion 26 is in the second insertion portion and the operation lever 56 is in the second rotation position, since the engagement claws 46 pushed toward an outside of the tube portion 42 by the preventive portions 30 engage the edge of the attachment hole 100A, engagement strength between the engagement claws 46 and the attachment hole 100A is improved. Accordingly, the grommet 40 is firmly retained to the vehicle body 100.

As above, the retainer 22 is attached to the vehicle body 100.

In the clip of the present embodiment, since the guide portions 64 are provided at the periphery of the insertion hole 60 of the base member 24, when the pin portion 26 of the retainer 22 is inserted into the tube portion 42 of the grommet 40, the operation portion 58 of the operation lever 56 contacts the guide portions 64 and is guided to the insertion hole 60 (refer to FIG. 13 to FIG. 16). As above, in the clip 20, when the pin portion 26 is inserted into the tube portion 42, since the operation portion 58 is guided (lead) by the guide portions 64, positioning of the grommet 40 relative to the retainer 22 is made easily.

As above, according to the clip 20, when the grommet 40 is attached to the retainer 22, positioning of the grommet 40 relative to the retainer 22 can be easily made.

In the clip 20, when the pin portion 26 is inserted into the tube portion 42, since the operation portion 58 is guided (lead) by the guide portion 64, the operation portion 58 is positioned to the correct position in the insertion hole 60. Thus, it is possible to suppress the incorrect attachment of the grommet 40 to the retainer 22.

Also, in the clip 20, since the guide portion 64 is an inclined face inclining toward the hole edge of the insertion hole 60, it is possible to smoothly guide the operation portion 58 reached at the guide portion 64 to the insertion hole 60.

Also, in the clip 20, since the guide portion 64 is formed at the projection portion 65 provided on the base member 24, by contacting the operation portion 58, rigidity of the guide portion 64 receiving a force from the operation portion 58 is improved. Namely, in the present embodiment, since the guide portion 64 is provided at the projection portion 65, the rigidity of the guide portion 64 is improved without thinning the thickness at the portion of the base member 24 where the guide portion 64 is formed.

In the clip 20, since the guide 64 is arranged on the rotation trajectory of the operation portion 58 where a center is the tube portion 42, for example, when comparing a situation where the guide portion is arranged out of the rotation trajectory of the insertion portion where a center is the tube portion, the operation portion 58 is surely guided to the insertion hole 60.

Also, in the clip 20, since the guide portions 64 are arranged on both sides with the insertion hole 60 therebetween, for example, when comparing a situation where the guide portion is formed on one side with respect to the insertion hole, the operation portion 58 is surely guided to the insertion hole 60.

Also, in the clip 20, the operation lever 56 of the grommet 40 is moved from the first rotation position to the second rotation position, to thereby engage the engagement claw 46 provided at the tube portion 42 with the attachment hole 100A of the vehicle body 100, so that the grommet 40 is attached to the vehicle body 100. Also, the operation lever 56 of the grommet 40 is moved from the second rotation position to the first rotation position, to thereby disengage the engagement claw 46 provided at the tube portion 42 from the attachment hole 100A of the vehicle body, so that the grommet 40 can be detached from the vehicle body 100. Namely, by the simple operation of rotating the operation lever 56, it is possible to attach the grommet 40 to the vehicle body 100 or detach the grommet 40 from the vehicle 100 (in other words, dismount).

And, in the clip 20, the pin portion 26 of the retainer 22 is inserted into the tube portion 42 to attach the tube portion 42 to the pin portion 26, and in the attachment state, the tube portion 42 is inserted into the attachment hole 100A of the vehicle 100, so that the retainer 22 is attached to the vehicle body 100 through the grommet 40. Also, by holding a vehicle part by the retainer 22, it is possible to attach the vehicle part to the vehicle 100 through the clip 20 with the retainer 22 and the grommet 40.

Further, in the clip attachment structure, as above, when the grommet 40 is attached to the retainer 22, since the operation portion 58 is guided to the insertion hole 60 by the guide portion 64, the grommet 40 is correctly positioned with respect to the retainer 22. By using the clip 20, in the clip attachment structure, an attachment accuracy when the retainer 22 is attached to the vehicle body through the grommet 40 is improved.

In the clip 20 of the embodiment as described above, the insertion hole 60 is used as the inserted portion, but the disclosure is not limited to this structure. For example, instead of the insertion hole 60, as the inserted portion, an insertion dent in a dented shape may be used. In this case, an advantage such that when the grommet 40 is attached to the retainer 22, it is possible to easily position the grommet 40 to the retainer 22, can be obtained.

In the clip 20 of the embodiment as described above, the guide portions 64 are arranged on both sides with the insertion hole 60 therebetween, but the disclosure is not limited to the structure. For example, a guide portion may be formed circularly to surround the insertion hole 60. In this case, an advantage such that when the grommet 40 is attached to the retainer 22, it is possible to easily position the grommet 40 to the retainer 22, can be obtained.

In the clip 20 of the embodiment as described above, the insertion hole 60 and the guide portions 64 are provided in the base member 24 and the operation portion 58 is provided at the operation lever 56, but the disclosure is not limited to the structure, For example, an insertion projection projecting in the same direction as the pin portion 26 may be provided in the base member 24, an insertion hole to which the insertion projection is inserted may be provided at the portion projecting from the tube portion 42, and a guide portion for guiding the insertion projection may be provided around the insertion hole. In these cases, an advantage such that when the grommet 40 is attached to the retainer 22, it is possible to easily position the grommet 40 to the retainer 22, can be obtained.

As explained above, the one embodiment of the disclosure has been explained, but the disclosure is not limited to the above, and the invention can be made with various modifications without changing the subject of the invention.

In the above embodiments, further additional notes are disclosed, as follows:

(Note 1)

A clip, comprises:

a first member including a base member, a pin portion projecting from the base member, and an inserted portion which is a dent or a through hole provided in the base member, and a second member including a tube portion configured to be inserted into an attachment hole formed in an attachment member and attached thereto, to which the pin portion is inserted inside and rotationally attached, and an insertion portion inserted into the inserted portion when the pin portion is inserted into the tube portion, wherein a guide portion which contacts the insertion portion when the pin portion is inserted into the tube portion, and guides the insertion portion to the inserted portion, is provided around the inserted portion of the base member.

In the clip of Note 1, the first member is attached to the attachment member through the second member by inserting the pin portion of the first member into the tube portion to attach the pin portion to the tube portion, and in the attachment condition, inserting the tube portion into the attachment hole of the attachment member. Namely, the above clip having the first member and the second member is attached to the attachment member.

Here, since in the above clip, the guide portion is provided around the periphery of the inserted portion in the base member, when the pin portion of the first member is inserted into the tube portion of the second member, the insertion portion contacts the guide portion and is guided to the inserted portion. As above, in the clip, when the pin portion is inserted into the tube portion, since the insertion portion is guided by the guide portion, positioning of the second member relative to the first member can be made easily.

As above, according to the clip of Note 1, when the second member is attached to the first member, positioning of the second member relative to the first member can be made easily.

(Note 2)

A clip according to Note 1, wherein the guide portion is an inclined face inclining to an opening edge of the inserted portion.

In the clip according to the Note 2, since the guide portion is an inclined face inclining to the opening edge of the inserted portion, the insertion portion contacted to the guide portion can be smoothly guided to the guided portion.

(Note 3)

A clip according to Note 1 or Note 2, wherein a projection portion projecting in a direction same as the pin portion is provided around the inserted portion of the base member, and the guide portion is formed at a portion on an inserted portion side in the projection portion.

In the clip of Note 3, since the guide portion is provided at the projection portion provided in the base member, by contacting the insertion portion, the rigidity of the guide portion receiving a force from the insertion portion is improved.

(Note 4)

A clip according to any one of Notes 1 to 3, wherein the second member includes an arm portion which extends from the tube portion outwardly in a diameter direction, bends in a middle thereof and extends in an axial direction of the tube portion, the insertion portion is a tip of the arm portion, and the guide portion is arranged on a rotation trajectory of the insertion portion with the tube portion as a center.

In the clip of Note 4, since the guide portion is arranged on the rotation trajectory of the insertion portion with the tube portion as a center, for example, when comparing with a structure where the guide portion is arranged out of the rotation trajectory of the insertion portion with the tube portion as a center, the insertion portion can be surely guided to the inserted portion.

(Note 5)

A clip according to Note 4, wherein the guide portions are arranged on two sides with the inserted portion therebetween.

In the clip of Note 5, since the guide portions are arranged on two sides with the inserted portion therebetween, for example, when the guide portion is arranged on one side relative to the inserted portion, the insertion portion is surely guided to the inserted portion.

(Note 6)

A clip according to Note 5, wherein the arm portion is movable between a first rotation position where the tip is inserted into the inserted portion, and a second rotation position when rotated from the first rotation position with the tube portion as a center, and the tube portion includes an engagement claw which does not engage the attachment hole when the arm portion is located in the first rotation portion, and engages the attachment hole when the arm portion is located in the second rotation position.

In the clip of Note 6, when the arm portion of the second member is moved from the first rotation position to the second rotation position, the engagement claw provided on the tube portion engages the attachment hole, so that the second member is attached to the attachment member. Also, when the arm portion of the second member is moved from the second rotation position to the first rotation position, since the engagement claw provided at the tube portion disengages from the attachment hole of the attachment member, it is possible to remove the second member from the attachment portion.

(Note 7)

A clip comprises:

a first member including a base member, a pin portion projecting from the base member, and an insertion portion provided on the base member and projecting in a same direction as the base member, and a second member including a tube portion configured to be inserted into an attachment hole formed in an attachment member and attached thereto, to which the pin portion is inserted inside and rotationally attached, and an inserted portion to which the insertion portion is inserted when the pin portion is inserted into the tube portion, wherein a guide portion which contacts the insertion portion when the pin portion is inserted into the tube portion, and guides the insertion portion to the inserted portion, is provided around the inserted portion in the second member.

In the clip of Note 7, the pin portion of the first member is inserted to the tube portion to attach the pin portion to the tube portion, and in this state, the tube portion is inserted into the attachment hole of the attachment member for attachment, so that the first member is attached to the attachment member through the second member. Namely, the above clip including the first member and the second member is attached to the attachment member.

Here, in the clip, since the guide member is provided around the inserted portion in the second member, when the pin portion of the first member is inserted into the tube portion of the second member, the insertion portion contacts the guide portion to be guided to the inserted portion. As above, in the clip, when the pin portion is inserted into the tube portion, since the insertion portion is guided by the guide portion, positioning of the second member to the first member can be made easily.

Accordingly, in the clip of the Note 7, when the second member is attached to the first member, the positioning of the second member relative to the first member can be easily made.

(Note 8)

A clip according to any one of the Notes 1 to 7, wherein the attachment member is a vehicle body, and the first member is a retainer holding a vehicle part configured to be attached to the vehicle body.

In the clip of the Note 8, the pin portion of the retainer is inserted into the tube portion to attach the tube portion to the pin portion, and in this attachment condition, the tube portion is inserted into the attachment hole of the vehicle body to attach, so that the retainer is attached to the vehicle body through the second member. Also, by holding the vehicle part by the retainer, the vehicle part is attached to the vehicle body through the clip equipped with the retainer and the second member.

(Note 9)

A clip attachment structure comprises:

an attachment member with an attachment hole formed therein, and the clip according to any one of the Note 1 to Note 8, attached to the attachment member.

In the clip attachment structure of the Note 9, the pin portion of the first member is inserted into the tube portion to thereby attach the tube portion to the pin portion, and in the attachment state, the tube portion is inserted into the attachment hole of the attachment member for attachment, so that the first member is attached to the attachment member through the second member. Namely, the clip equipped with the first member and the second member is attached to the attachment member.

Here, in the clip, when the second member is attached to the first member, since the insertion portion is guided to the inserted portion by the guide portion, the second member is positioned to the correct position by the first member. Since the clip like this is used, in the attachment structure of the clip, attachment accuracy when the first member is attached to the attachment member through the second member is improved.

Incidentally, the disclosure of Japanese Patent Application No. 2021-103554 filed on Jun. 22, 2021 is incorporated entirely by reference into the present specification.

All the articles, patent applications and technical standards are incorporated into the specification by reference, as in the concretely and individually referred to by a reference for an individual article, a patent application and a technical standard.

What is claimed is:

1. A clip attachment structure, comprising:
an attachment member with an attachment hole formed therein, and
a clip attached to the attachment member, the clip comprising:
a first member including a base member, a pin portion projecting from the base member, and an inserted portion which is a dent or a through hole provided in the base member, and
a second member including a tube portion configured to be inserted into an attachment hole formed in the attachment member and attached thereto, to which the pin portion is inserted inside and rotationally attached, and an insertion portion inserted into the inserted portion when the pin portion is inserted into the tube portion,
wherein
a guide portion which contacts the insertion portion when the pin portion is inserted into the tube portion, and guides the insertion portion to the inserted portion is provided around the inserted portion of the base member,
the insertion portion of the second member projects radially outward from a center of the tube portion, and

the guide portion is arranged on a rotational rotation trajectory of the insertion portion with the center in the tube portion.

2. The clip attachment structure according to claim 1, wherein the guide portion is an inclined face inclining to an opening edge of the inserted portion.

3. The clip attachment structure according to claim 1, wherein a projection portion projecting in a direction same as the pin portion is provided around the inserted portion in the base member, and
the guide portion is formed at a portion on an inserted portion side in the projection portion.

4. The clip attachment structure according to claim 1, wherein the second member includes an arm portion which extends from the tube portion outwardly in a diameter direction, bends in a middle thereof and extends in an axial direction of the tube portion,
the insertion portion is a tip of the arm portion, and
the guide portion is arranged on a rotation trajectory of the insertion portion with the tube portion as a center.

5. The clip attachment structure according to claim 4, wherein the guide portion includes two guide faces which are arranged on two sides with the inserted portion therebetween.

6. The clip attachment structure according to claim 5, wherein the arm portion is movable between a first rotation position where the tip is inserted into the inserted portion, and a second rotation position when rotated from the first rotation position with the tube portion as a center, and
the tube portion includes an engagement claw which does not engage the attachment hole when the arm portion is located in the first rotation portion, and engages the attachment hole when the arm portion is located in the second rotation position.

7. The clip attachment structure according to claim 1, wherein the attachment member is a vehicle body, and
the first member is a retainer holding a vehicle part configured to be attached to the vehicle body.

* * * * *